United States Patent
Dudar (10) Patent No.: US 10,981,445 B2
(45) Date of Patent: Apr. 20, 2021

(54) METHOD AND SYSTEM FOR VEHICLE REFUELING

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 135 days.

(21) Appl. No.: 16/218,335

(22) Filed: Dec. 12, 2018

(65) Prior Publication Data
US 2020/0189385 A1 Jun. 18, 2020

(51) Int. Cl.
*B60K 15/035* (2006.01)
*B60K 15/03* (2006.01)

(52) U.S. Cl.
CPC ............ *B60K 15/03504* (2013.01); *B60K 2015/03144* (2013.01); *B60K 2015/03296* (2013.01); *B60K 2015/03514* (2013.01); *B60K 2015/03557* (2013.01); *B60K 2015/03561* (2013.01)

(58) Field of Classification Search
CPC ............ F02M 25/0836; F02M 25/089; F02M 25/0854; F02M 25/0809; F02M 25/0872; F02M 25/0818; F02M 25/08; F02D 41/004; F02D 41/0032; F02D 41/003; F02D 41/0045; B60K 15/03504; B60K 2015/03514; B60K 15/03519; B60K 2015/03561; B60K 2015/03144; B60K 2015/03557; B60K 2015/03296

USPC ...................................... 123/519, 520, 521
See application file for complete search history.

(56) References Cited

U.S. PATENT DOCUMENTS

| | | | | |
|---|---|---|---|---|
| 4,836,172 A * | 6/1989 | Haruta | ........... | F02M 25/0854 123/520 |
| 4,951,643 A * | 8/1990 | Sato | ............... | F02M 25/0836 123/519 |
| 5,027,780 A * | 7/1991 | Uranishi | ........... | F02D 41/0042 123/516 |
| 5,456,236 A * | 10/1995 | Wakashiro | ......... | F02M 25/0854 123/519 |
| 5,460,136 A * | 10/1995 | Yamazaki | .......... | F02M 25/0854 123/519 |
| 5,623,911 A * | 4/1997 | Kiyomiya | .......... | F02M 25/0854 123/516 |
| 6,431,156 B1 * | 8/2002 | Murakami | ........... | F02M 25/08 123/516 |
| 9,732,685 B2 | 8/2017 | Dudar | | |
| 10,047,705 B2 | 8/2018 | Dudar et al. | | |
| 2011/0240145 A1 | 10/2011 | Pifer | | |
| 2014/0026992 A1 | 1/2014 | Pearce et al. | | |

FOREIGN PATENT DOCUMENTS

JP 2011185227 A 9/2011

* cited by examiner

*Primary Examiner* — Sizo B Vilakazi
(74) *Attorney, Agent, or Firm* — Geoffrey Brumbaugh; McCoy Russell LLP (57) ABSTRACT

Methods and systems are provided for providing improving customer satisfaction during a vehicle fuel tank refueling event. A fuel system is configured with a three-way isolation valve and a four port canister. Fuel tank depressurization is expedited by directing fuel tank vapors to a dedicated depressurization port of the canister.

19 Claims, 6 Drawing Sheets

METHOD AND SYSTEM FOR VEHICLE REFUELING

FIELD

The present description relates generally to methods and systems for expediting fuel tank depressurization prior to a refueling event.

BACKGROUND/SUMMARY

Vehicle fuel systems include evaporative emission control systems designed to reduce the release of fuel vapors to the atmosphere. For example, vaporized hydrocarbons (HCs) from a fuel tank may be stored in a fuel vapor canister packed with an adsorbent which adsorbs and stores the vapors. At a later time, when the engine is in operation, the evaporative emission control system allows the vapors to be purged into the engine intake manifold for use as fuel.

In a hybrid vehicle, the fuel vapors stored in the canister are primarily refueling vapors. A fuel tank isolation valve isolates fuel vapors generated in the fuel tank from running loss and diurnal temperature cycles. These fuel vapors are therefore not be transferred into the fuel vapor canister and, instead, are contained within the fuel tank via the closed isolation valve. As a result, pressure may build in the fuel tank. When a vehicle operator indicates a demand to refuel the hybrid vehicle, a fuel cap may remain locked until venting of the fuel tank is allowed. In particular, the fuel cap is unlocked only after the tank is sufficiently depressurized, protecting the vehicle operator from being sprayed with fuel vapor. As a result, the vehicle operator, or a gas station attendant (or other "customer"), may have to wait for a time until the fuel tank is ready for refueling.

Various approaches have been developed to expedite fuel tank depressurization. One example approach is shown by Pearce et al in US 2014/0026992. Therein, a vacuum pump is coupled to the outlet of a fuel vapor carbon canister. The vacuum pump is activated to increase air flow through the canister from the fuel tank when the fuel tank isolation valve is opened during refilling.

However, the inventors herein have recognized potential issues with such an approach. As one example, the need for a vacuum pump may increase component cost and complexity without significantly improving depressurization time. As another example, the battery operated vacuum pump may affect the fuel economy of a hybrid vehicle. In still other approaches, the isolation valve may be pulsed to vent the fuel tank pressure. This, however, may require the engine to be combusting fuel, and the same approach cannot be used for pressure control when a vehicle is propelled in an electric mode.

As such, the main time constant associated with fuel tank depressurization is based on a length of the fuel vapor canister. The longer the canister, the more time it may take for fuel tank pressure to reach atmosphere. The depressurization time may also be affected by the fuel tank size. In vehicle systems having multiple series canisters and large fuel tanks, such as trucks, the depressurization time may become significantly longer. If a fuel tank is not depressurized in a timely manner, it can result in customer anxiety and dissatisfaction. For example, the customer may be confused as to why the refueling door has not opened soon after they have pressed a refueling button, stepped out of the vehicle, processed a payment at a refueling station, and pulled out a gas nozzle from a fuel pump. In some cases, the customer may be unaware that depressurization is ongoing and may repeatedly press a refueling button on the vehicle dash to confirm or expedite the refueling, causing controller errors. While some operators may be aware of an average wait time for their vehicle, operators using a shared vehicle or an autonomous vehicle may not be aware of the wait time, adding to the confusion. The same may occur if the gas station is a full service gas station having an attendant who dispenses fuel and is unaware of the vehicle's depressurization characteristics.

In one example, the above mentioned issue may be at least partly addressed by a vehicle method comprising: responsive to a refueling request, actuating a valve to a first position to depressurize a fuel tank to a first port of a canister while maintaining a refueling lock engaged; and after depressurization of the fuel tank, disengaging the refueling lock and actuating the valve to a second position to direct refueling vapors to a second, different port of the canister. In this way, fuel tank depressurization can be expedited, reducing customer confusion.

For example, a vehicle fuel system may include a fuel vapor canister having four ports, the canister coupled to a fuel tank via a three-way isolation valve. Typically, canisters have three ports: one for loading the canister, one for purging the canister, and one for venting the canister. A fourth port may be included in the canister at a location furthest away from the load port (and proximate the vent port) with sufficient activated carbon between the vent port and the fourth port to expedite the depressurization time. In particular, the carbon buffer surrounding the fourth port may be smaller than the carbon buffer surrounding the load port of the canister. In the case of a fuel system having multiple canisters coupled in series, only the most downstream of the canisters may be configured as a four port canister. Operation of the isolation valve may be controlled by two solenoid valves as a function of the canister load. If the canister load is higher than a threshold at the time of refueling, canister depressurization can be performed by actuating the isolation valve to a first position where the fuel tank is depressurized by venting fuel vapors through the load port of the canister. If the canister load is lower than the threshold at the time of refueling, canister depressurization can be expedited by actuating the isolation valve to a second position where the fuel tank is depressurized by venting fuel vapors through the fourth port of the canister. Canister loading through the fourth port may result in a faster depressurization of the fuel tank relative to canister loading through the load port.

In still other examples, responsive to the refueling request, a vehicle controller may estimate a time required to depressurize the fuel tank. Operation of the isolation valve may then be adjusted as a (weighted) function of the estimated depressurization time and the canister load. For example, when the depressurization time is higher (than a threshold), or the canister load is lower (than another threshold), the fuel tank may be preferentially depressurized via the fourth port.

In this way, fuel tank depressurization may be expedited via the inclusion of an additional port in a fuel system canister. The technical effect of using a canister having an extra port with a small carbon buffer positioned opposite the load port is that fuel vapors can be quickly absorbed allowing for a rapid depressurization of a fuel tank. This reduces a delay incurred before fuel can be dispensed into a fuel tank. By expediting fuel tank depressurization prior to a refueling event, confusion and dissatisfaction for vehicle operators unfamiliar with the vehicle can reduced, thereby averting premature opening of the fuel door. In addition, repeated actuation of a refueling button by a vehicle operator is preempted. Overall, confusion related to refueling operations is reduced, and customer satisfaction is improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
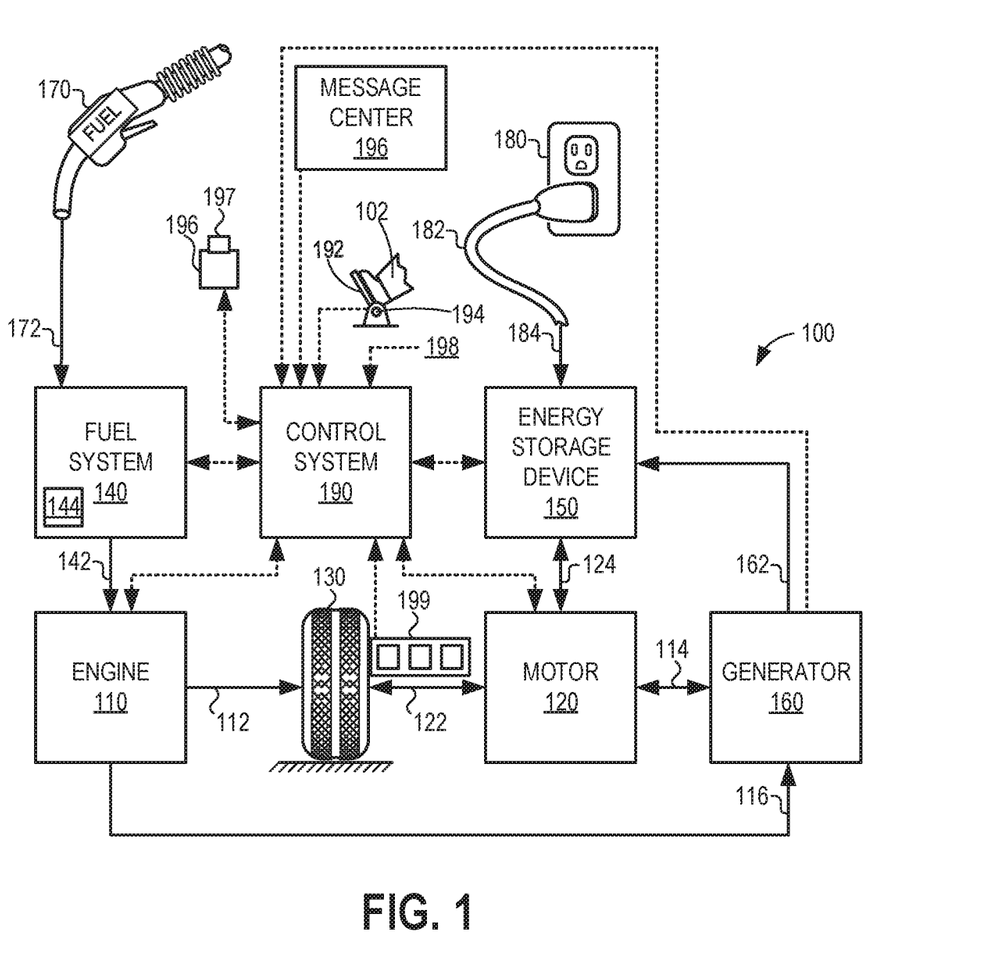
FIG. 1 shows an example vehicle propulsion system.
Figure 2:
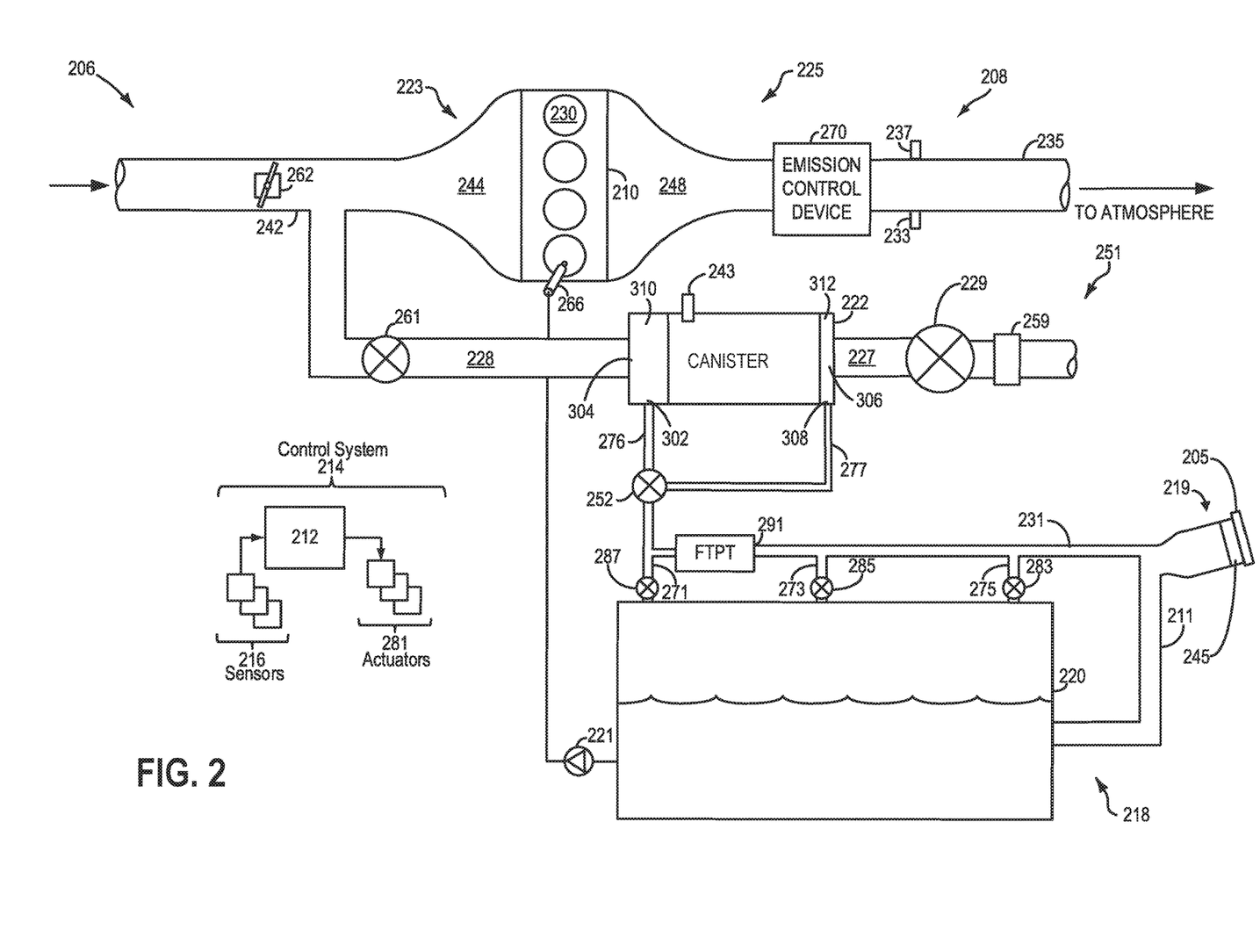
FIG. 2 shows an example fuel system and evaporative emissions system including a multi-port canister and a multi-way isolation valve that may be coupled to the vehicle propulsion system of FIG. 1.
Figure 3:
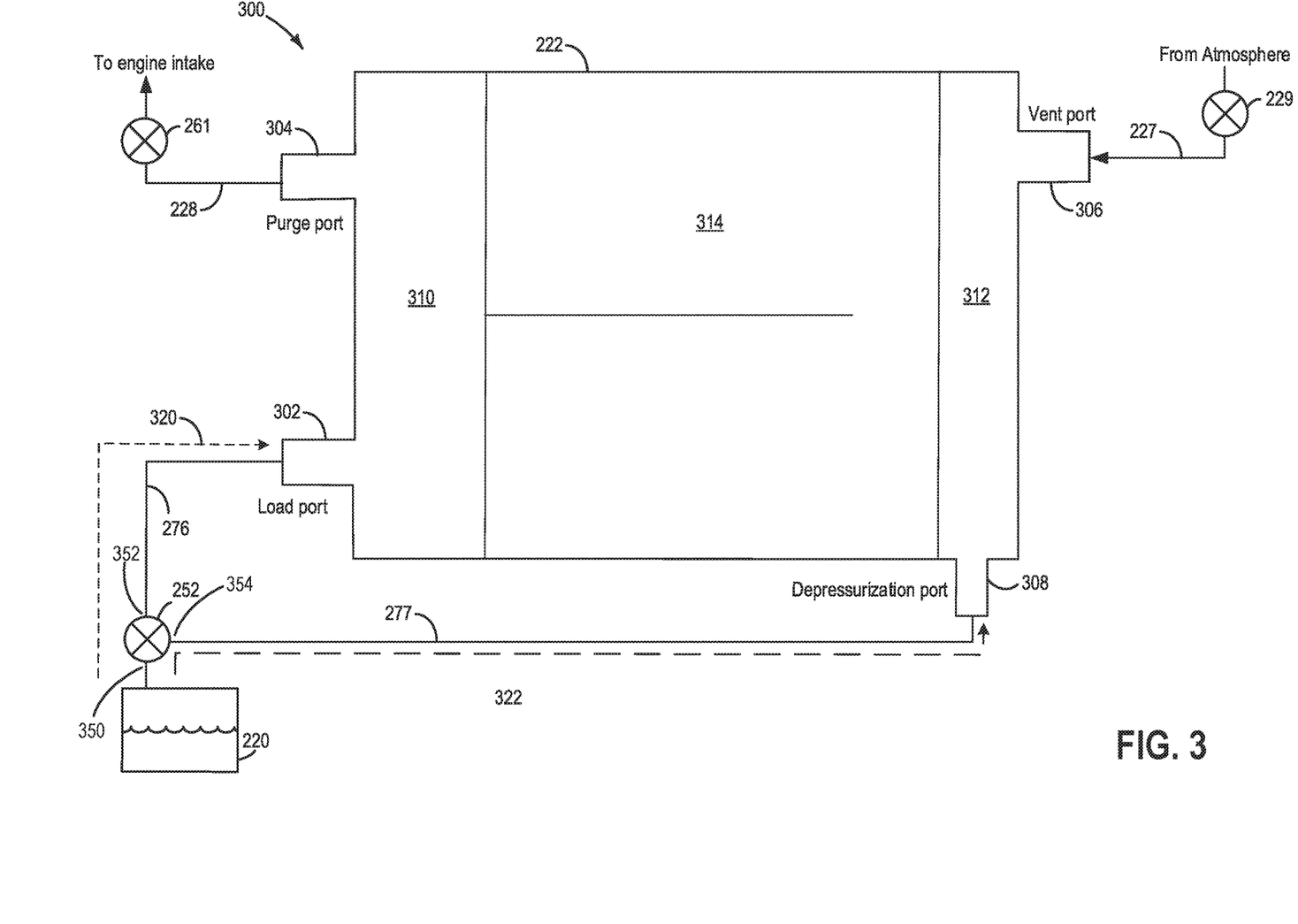
FIG. 3 shows a detailed embodiment of a four port canister coupled to a three-way isolation valve coupled to an engine evaporative emissions system.
Figure 4:
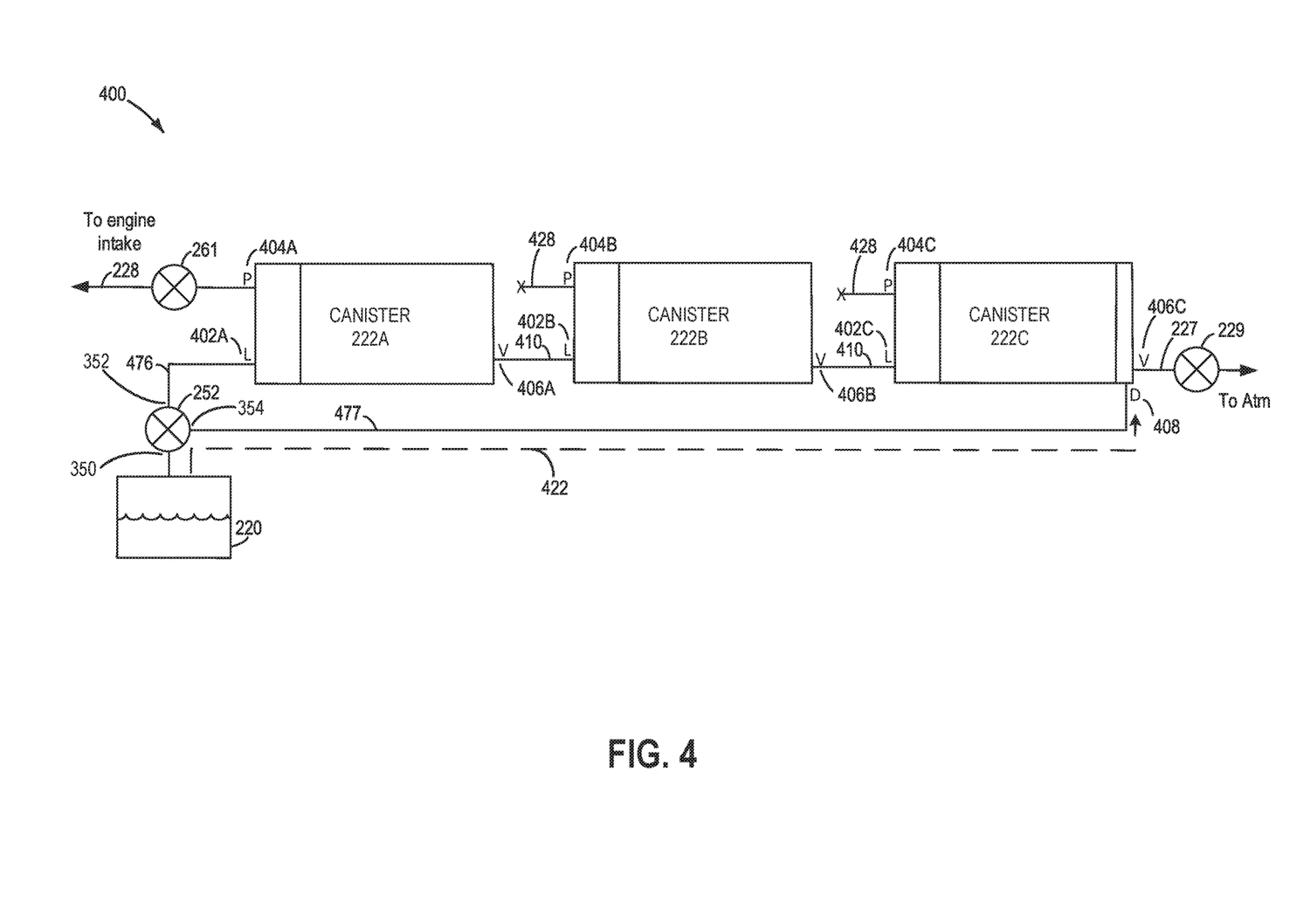
FIG. 4 shows an example configuration for a multi-canister embodiment of the evaporative emissions system of FIG. 2.
Figure 5:
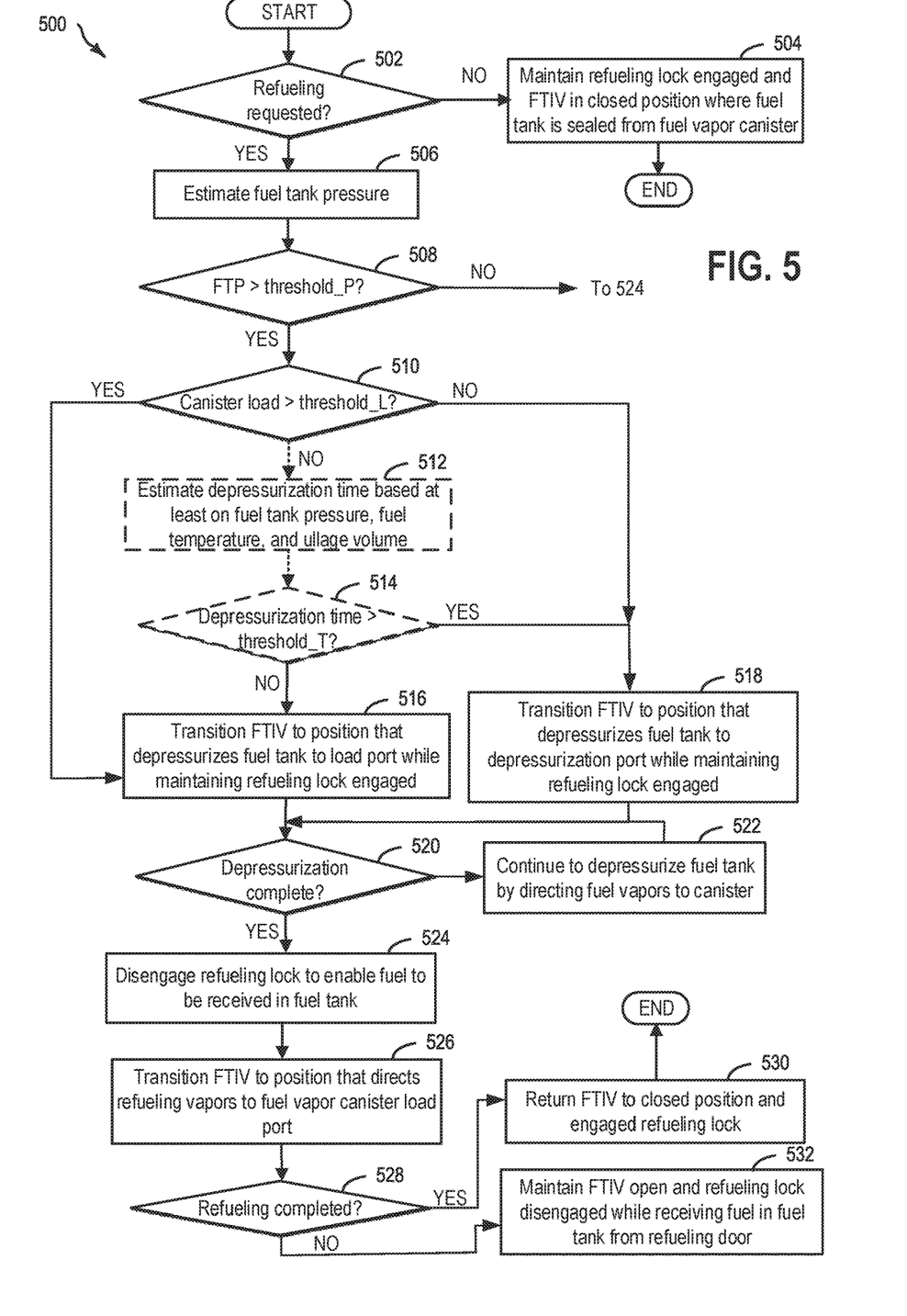
FIG. 5 shows a high level flow chart of an example method for a refueling event in a hybrid vehicle including a multi-port canister and a multi-way isolation valve.
Figure 6:
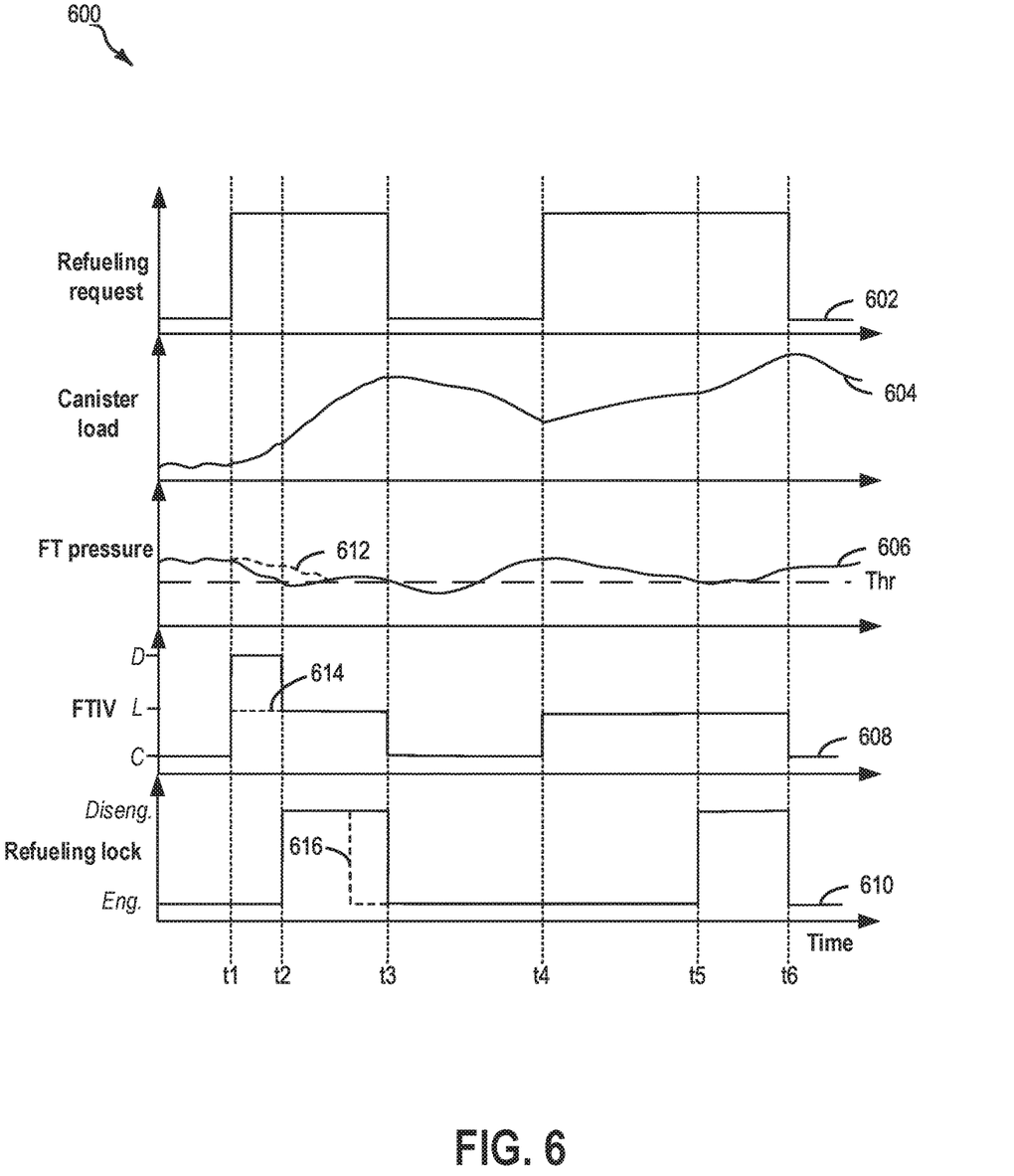
FIG. 6 shows a prophetic example of fuel tank depressurization during a refueling event.

The following description relates to systems and methods for improving operator satisfaction during a fuel tank depressurization event in a hybrid vehicle system, such as in the vehicle system of FIG. 1. The fuel tank may be depressurized before fuel can be received in the fuel tank following a refueling request, through the use of a multi-port canister coupled to a multi-way isolation valve, such as shown at FIGS. 2-4. By selectively directing fuel tank vapors to a distal location of the canister via a dedicated port, depressurization times can be reduced. A vehicle controller may be configured to execute a control routine, such as the example routine of FIG. 5, to depressurize a fuel tank responsive to a refueling request by adjusting the operation of a three-way isolation valve coupling the fuel tank to a four port canister. A prophetic example of fuel tank depressurization prior to refueling is shown at FIG. 6.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor container such as fuel vapor canister 222 which may be used to capture and store fuel vapors. In some examples, vehicle system 206 may be a hybrid electric vehicle system, such as vehicle system 100 of FIG. 1.

The engine system 208 may include engine 210 having a plurality of cylinders 230. In one example, engine 210 includes engine 110 of FIG. 1. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. In one example, fuel tank 220 includes fuel tank 144 of FIG. 1. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe 211 or neck 211.

Further, fuel filler system 219 may include refueling lock 245. In some embodiments, refueling lock 245 may be a fuel cap locking mechanism. The fuel cap locking mechanism may be configured to automatically lock the fuel cap 205 in a closed position so that the fuel cap cannot be opened. For example, the fuel cap 205 may remain locked via refueling lock 245 while pressure or vacuum in the fuel tank 220 is greater than a threshold. In response to a refueling request, e.g., a vehicle operator initiated request via actuation of a refueling button on a vehicle dashboard (such as refueling button 197 on dashboard 196 of FIG. 1), the fuel tank may be depressurized and the fuel cap unlocked after the pressure or vacuum in the fuel tank falls below a threshold. Herein, unlocking the refueling lock 245 may include unlocking the fuel cap 205. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some embodiments, refueling lock 245 may be a filler pipe valve located at a mouth of fuel filler pipe 211. In such embodiments, refueling lock 245 may not prevent the removal of fuel cap 205. Rather refueling lock 245 may prevent the insertion of a refueling pump into fuel filler pipe 211. The filler pipe valve may be electrically locked, for example by a solenoid, or mechanically locked, for example by a pressure diaphragm.

In some embodiments, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In embodiments where refueling lock 245 is locked using an electrical mechanism, refueling lock 245 may be unlocked by commands from controller 212, for example, when a fuel tank pressure decreases below a pressure threshold. In embodiments where refueling lock 245 is locked using a mechanical mechanism, refueling lock 245 may be unlocked via a pressure gradient, for example, when a fuel tank pressure decreases to atmospheric pressure.

Emissions control system 251 may include one or more fuel vapor canisters 222 (herein also referred to simply as canister) filled with an appropriate adsorbent, the canisters configured to temporarily trap fuel vapors (including vaporized hydrocarbons) generated during fuel tank refilling operations and "running loss" vapors (that is, fuel vaporized during vehicle operation). In one example, the adsorbent used is activated charcoal. Emissions control system 251 may further include a canister ventilation path or vent line 227 which may route gases out of the fuel vapor canister 222 to the atmosphere when storing, or trapping, fuel vapors from fuel system 218.

Vent line 227 may also allow fresh air to be drawn into canister 222 via vent valve 229 when purging stored fuel vapors from fuel system 218 to engine intake 223 via purge line 228 and purge valve 261. For example, purge valve 261 may be normally closed but may be opened during certain conditions (such as certain engine running conditions) so that vacuum from engine intake manifold 244 is applied on the fuel vapor canister for purging. In some examples, vent line 227 may include an optional air filter 259 disposed therein upstream of canister 222. Flow of air and vapors between canister 222 and the atmosphere may be regulated by canister vent valve 229.

Canister 222 is configured as a multi-port canister. In the depicted example, canister 222 has four ports. These include a first load port 302 coupled to conduit 227 through which fuel vapors from fuel tank 220 are received in canister 222. In other words, fuel vapors that are to be absorbed in the canister 222 may be received via load port 302. Canister 222 further includes a second purge port 304 coupled to purge line 228 through which fuel vapors stored in the canister 222 can be released to the engine intake for combustion. In other words, fuel vapors that are desorbed from the canister 222 are purged to the engine intake via purge port 304. Canister 222 further includes a third purge port 306 coupled to vent line 227 through which air flow is received in the canister 222. The ambient air may be received in the canister for flowing through the adsorbent and releasing fuel vapors to the engine intake. Alternatively, air containing fuel vapors received in the canister via load port 302 may be vented to the atmosphere after the fuel vapors are adsorbed in canister 222.

Canister 222 further includes a fourth depressurization port 308 for expediting fuel tank depressurization during a refueling event. The depressurization port 308 is positioned on the distal end of the canister, adjacent to the vent port 306. Sufficient activated carbon, in the form of buffer 312, is provided between the depressurization port 308 and the vent port 306 to expedite depressurization times. In one example, the inclusion of the depressurization port 308 on the canister 222 is to address a worst case vapor pressure inside the fuel tank 220, and the amount of adsorbent in buffer 312 is defined by the amount of carbon needed to adsorb the amount of fuel vapors corresponding to the worst case vapor pressure. In this way, by including depressurization port 308, a "short circuit" path is opened through the canister for the fuel tank vapors, thereby reducing fuel tank depressurization time. A detailed description of canister 222 including an additional depressurization port is provided herein at FIG. 3. In embodiments where the evaporative emissions system 251 includes a plurality of canisters connected in series, the terminal canister (that is, the last canister which is most downstream and closest to the vent line) may be configured as a multi-port canister having a depressurization port, while remaining canisters may be configured as conventional three-port canisters, without a depressurization port. A detailed description of such a multi-canister arrangement is provided herein at FIG. 4.

Canister 222 may include two buffer regions, a first buffer 310 surrounding load port 302 and a second buffer 312 surrounding depressurization port 308. Like canister 222, buffers 310, 312 may also comprise adsorbent. The volume of each of buffer 310, 312 may be smaller than (e.g., a fraction of) the volume of canister 222. Further, the volume of buffer 312 surrounding the depressurization port 308 is smaller than the volume of buffer 310 surrounding the load port 302. The adsorbent in the buffers 310, 312 may be same as, or different from, the adsorbent in the canister (e.g., both may include charcoal). Buffer 310 may be positioned within canister 222 such that during canister loading through load port 302, fuel tank vapors are first adsorbed within the buffer, and then when the buffer is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. Likewise, buffer 312 may be positioned within canister 222 such that during canister loading through depressurization port 308, fuel tank vapors are first adsorbed within the buffer 312, and then when the buffer 312 is saturated, further fuel tank vapors are adsorbed in the main body of the canister. In comparison, when purging canister 222 with air drawn through vent line 227, fuel vapors are first desorbed from the canister (e.g., to a threshold amount) before being desorbed from the buffer. In other words, loading and unloading of buffers 310, 312 is not linear with the loading and unloading of the canister, or each other. As such, the effect of the canister buffers is to dampen any fuel vapor spikes flowing from the fuel tank to the canister, thereby reducing the possibility of any fuel vapor spikes going to the engine or being released through a tailpipe.

Fuel tank 220 is fluidically coupled to canister 222 via each of a first conduit 276 and a second conduit 277, the first and second conduits diverging from a common fuel tank isolation valve (FTIV) 252 which controls the flow of fuel tank vapors from fuel tank 220 and vapor recovery line 231 into canister 222. In the depicted example, FTIV 252 is configured as a multi-way solenoid valve, specifically, a three-way valve. By adjusting a position of FTIV 252, fuel vapor flow from the fuel tank 220 to the canister 222 can be varied.

For example, FTIV 252 may be actuated to a first position that seals fuel tank 220 from canister 222, wherein no fuel vapors flow through either conduit 276 or 277. FTIV 252 may be actuated to a second position that couples fuel tank 220 to canister 222 via conduit 276, with no fuel vapor flow through conduit 277. Further, FTIV may be actuated to a third position that couples fuel tank 220 to canister 222 via conduit 277, wherein no fuel vapor flow through conduit 276. Controller 212 may command an FTIV position based on fuel system conditions including an operator request for refueling, fuel tank pressure, and canister load. An example routine for selecting an FTIV position and a direction of fuel vapor flow into the canister 222 is shown at FIG. 5.

In configurations where the vehicle system 206 is a hybrid electric vehicle (HEV), fuel tank 220 may be designed as a sealed fuel tank that can withstand pressure fluctuations typically encountered during normal vehicle operation and diurnal temperature cycles (e.g., steel fuel tank). In addition, the size of the canister 222 may be reduced to account for the reduced engine operation times in a hybrid vehicle. However, for the same reason, HEVs may also have limited opportunities for fuel vapor canister purging operations. Therefore the use of a sealed fuel tank with a closed FTIV (also referred to as NIRCOS, or Non Integrated Refueling Canister Only System), prevents diurnal and running loss vapors from loading the fuel vapor canister 222, and limits fuel vapor canister loading via refueling vapors only. FTIV 252 may be selectively opened responsive to a refueling request so depressurize the fuel tank 220 before fuel can be received into the fuel tank via fuel filler pipe 211. In particular, as elaborated with reference to FIG. 5, FTIV 252 may be actuated to a first (open) position to depressurize the fuel tank to the canister via first conduit 276 and canister load port 302. Alternatively, FTIV 252 may be actuated to a second, different (also open) position to depressurize the fuel tank to the canister via second conduit 277 and additional depressurization port 308

In some embodiments (not shown), a pressure control valve (PCV) may be configured in a conduit coupling fuel tank 220 to canister 222 in parallel to conduits 276, 277. When included, the PCV may be controlled by the powertrain control module (e.g. controller 212) using a pulse-width modulation cycle to relieve any excessive pressure generated in the fuel tank, such as while the engine is running. Additionally or optionally, the PCV may be pulse-width modulated to vent excessive pressure from the fuel tank when the vehicle is operating in electric vehicle mode, for example in the case of a hybrid electric vehicle.

When transitioned to the second or third position (both open positions), FTIV 252 allows for the venting of fuel vapors from fuel tank 220 to canister 222. Fuel vapors may be stored in canister 222 while air stripped off fuel vapors exits into atmosphere via canister vent valve 229. Stored fuel vapors in the canister 222 may be purged to engine intake 223, when engine conditions permit, via canister purge valve 261. Refueling lock 245 may be unlocked to open a fuel cap only after fuel tank is sufficiently depressurized, such as below the second threshold pressure.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, exhaust temperature or pressure sensor 233, fuel tank pressure transducer (FTPT) or pressure sensor 291, and canister load sensor 243. As such, pressure sensor 291 provides an estimate of fuel system pressure. In one example, the fuel system pressure is a fuel tank pressure, e.g. within fuel tank 220. Other sensors such as pressure, temperature, air/fuel ratio, and composition sensors may be coupled to various locations in the vehicle system 206. As another example, the actuators may include fuel injector 266, throttle 262, FTIV 252, refueling lock 245, canister vent valve 229, and canister purge valve 261. The control system 214 may include a controller 212. The controller may receive input data from the various sensors, process the input data, and trigger the actuators in response to the processed input data based on instruction or code programmed therein corresponding to one or more routines. An example control routine is described herein with regard to FIG. 5. The controller 212 receives signals from the various sensors of FIGS. 1-2 and employs the various actuators of FIGS. 1-2 to adjust engine operation based on the received signals and instructions stored on a memory of the controller.

For example, responsive to an operator refueling request, the controller may retrieve sensor input from fuel tank pressure sensor 291 and compare it to a threshold. If the pressure is higher than the threshold, the controller may send a signal commanding FTIV 252 to a position that expedites depressurization of the fuel tank. Therein, based on canister load, as estimated via sensor 243, and/or based on an estimated time to depressurize the fuel tank, the controller 212 may adjust the position of FTIV 252 to either depressurize the fuel vapors to the load port 302 of canister 222 or depressurization port 308 of canister 222. Once the fuel tank has been sufficiently depressurized, as inferred based on the fuel tank pressure sensor output, the controller may send a signal commanding the refueling lock 245 to open or disengage so that fuel can be received in fuel tank 220 via filler pipe 211.

FIG. 3 shows an example embodiment 300 of a canister 222 having four ports including an additional depressurization port for expediting fuel tank depressurization during fuel tank refueling is shown. FIG. 4 shows an example embodiment 400 of a multi-canister arrangement. Components previously introduced in FIG. 2 are similarly numbered in FIGS. 3-4 and not reintroduced for brevity.

Turning first to FIG. 3, canister 222 includes load port 302 (also referred to as a tank port) through which canister 222 is loaded with fuel vapors. These may include fuel tank vapors from fuel tank depressurization and/or refueling vapors generated when fuel is dispensed into fuel tank 220. Fuel vapor flow into load port 302 is controlled via three-way valve FTIV 252. Specifically, when FTIV 252 is in a position that couples fuel tank 220 to conduit 276, fuel vapors may be loaded into canister 222 through load port 302.

Canister 222 further includes purge port 304 through which fuel vapors stored in canister 222 are purged to an engine intake. Purge flow from the canister to the engine intake is controlled via canister purge valve 261 positioned in purge line 228 coupling the purge port of the canister to the engine intake.

Canister 222 further includes vent port 306 through which canister 222 is vented. This includes drawing air into canister 222 from the atmosphere via vent port 306 to desorb stored fuel vapors from the canister adsorbent when purging the fuel vapors to the engine intake. This also includes flowing air from which vaporized hydrocarbons have been adsorbed at the canister 222 to the atmosphere via vent port 306 when loading fuel vapors in the canister. Vent flow between the canister and the atmosphere is controlled via canister vent valve 229 positioned in vent line 227 coupling the vent port of the canister to the atmosphere.

Canister 222 further includes depressurization port 308 through which fuel tank 220 is depressurized prior to dispensing fuel in the fuel tank. In other words, canister 222 is loaded with fuel vapors received from the fuel tank during depressurization via depressurization port 308. Fuel vapor flow into depressurization port 308 is controlled via three-way valve FTIV 252. Specifically, when FTIV 252 is in a position that couples fuel tank 220 to conduit 277, fuel vapors may be loaded into canister 222 through depressurization port 308.

Load port 302 and purge port 304 may be positioned on a common end of the canister 222, herein the proximal end. In comparison, vent port 306 and depressurization port 308 are positioned on an opposite end of the canister, herein the distal end, opposite the distal end. In one example, the vent port 306 may be configured opposite the purge port 304. Alternatively, the vent port 306 may be positioned opposite the load port 302. The depressurization port 308 may be positioned on a surface opposite the load port 302. In addition, depressurization port may be coupled to canister 222 perpendicular to vent port 306. Due to the proximity of depressurization port 308 to the vent port 306 and vent line 227, as well as due to the smaller buffer 312 surrounding depressurization port 308 as compared to the larger buffer 310 surrounding load port 302, the duration spent by fuel vapor flow through canister 222 is reduced. In particular, fuel vapors received from the fuel tank during depressurization are adsorbed in the activated carbon in the buffer region 312 surrounding the vent port and the depressurization port. This "short circuit" path 322 through depressurization port 308 therefore allows for a faster depressurization of the fuel tank as compared to fuel vapor flow through load port 302 (shown as path 320).

In some examples, depressurization port 308 may also have a larger orifice and a larger aperture than load port 302. As a result, depressurization port 308 may be configured to allow a higher fuel vapor flow rate than load port 302.

FTIV 252 is configured as a three-way valve and couples fuel tank 220 selectively to one of load port 302 and depressurization port 308. When actuated to position 450, FTIV 252 is closed resulting in the canister 222 being sealed from the fuel tank 220. When actuated to position 452, canister 222 is coupled to fuel tank 222 at load port 302. When actuated to position 454, canister 222 is coupled to fuel tank 222 at depressurization port 308.

In evaporative emission system embodiments having multiple canisters, as shown at embodiment 400 in FIG. 4, only the most downstream canister may be configured as a four port canister having a depressurization port. Embodiment 400 includes three canisters 222A-C that are serially connected wherein only canister 222C is configured with a depressurization port. Other embodiments may include fewer or more canisters. Purge port 404A of canister 222A is directly coupled to the engine intake via purge line 228 and purge valve 261. In comparison, purge ports 404B and 404C or canister 222B and 222C, respectively, are held closed. Vent port 406C of canister 222C is directly coupled to the atmosphere via vent line 227 and vent valve 229. Load port 402A of canister 222A is directly coupled to the fuel tank via FTIV 252. In comparison, canister 222A is coupled to canister 222B via vent port 406A (of canister 222A) and load port 402B (of canister 222B). Likewise, canister 222B is coupled to canister 222C via vent port 406B (of canister 222B) and load port 402C (of canister 222C). Fuel tank 220 is also coupled, via FTIV 252, to depressurization port 408 of canister 222C. In this way, a short circuit path 422 for depressurization is provided through canister 222C only, while a longer depressurization path is provided through sequential routing of fuel vapors through canister 222A, then 222B, and then 222C, via load port 402A.

After an operator requests refueling, they may not be aware of depressurization times. This can lead to customer dissatisfaction and confusion. For example, the vehicle operator may have to wait a long time for depressurization to be complete without being aware of the status of the fuel tank at any time while waiting for the tank to depressurize. This can cause the operator to not be sure if depressurization is actually occurring or if the refueling request even went through. To compensate, the operator may press the refueling button over and over again. The repeated and excessive depressurization of the refueling button may cause controller errors. While a vehicle operator may have learned, over time, the average time taken for the fuel tank of the given vehicle to depressurize, there may be additional, unexpected delays, such as due to a higher ambient temperature. For example, the wait may be longer on hot days when the vehicle has been driven a long distance before refueling is requested. As an example, typical depressurization times may be in the range of 15 seconds, and can increase to 115 seconds on hot summer days after being driven a long distance. There may also be situations where the driver is not familiar with the vehicle, such as can occur when the vehicle is a shared vehicle or an autonomous vehicle. The driver there may not even be aware of the average time taken to depressurize the fuel tank, let alone the variations. A temporary driver of a shared vehicle, unaware of the long depressurization time, may try to force open the refueling door, causing fuel system damage. If the vehicle is being refueled at a full service gas station where an attendant refuels the vehicle (while the vehicle operator remains inside the vehicle), the attendant may not be aware of the depressurization time and may become confused when the vehicle's refueling door does not open. They may try to pry the refueling door open without success.

These issues may become exacerbated as trucks become electrified in the future. The depressurization times may become longer due to the larger fuel tank size of trucks (e.g., 40 gallons) as well as the inclusion of multiple canister in a series configuration. As an example, if it takes 15 seconds to depressurize a 13 gallon HEV, the depressurization time may grow 3-fold in a 40 gallon tank. As elaborated herein, to address these issues, fuel tank depressurization may be expedited via selective flowing of fuel tank vapors to a depressurization port of a canister (e.g., depressurization port 308 of FIG. 3 or port 408 of FIG. 4).

During refueling events, and when pressure in fuel tank 220 is higher than a pressure threshold, FTIV 252 may be actuated to one of position 352 and position 354 to decrease the pressure in fuel tank 220 to the pressure threshold by venting fuel tank vapors to the canister 222 via one of load port 302 (or 302A) and depressurization port 308 (or 408). Since depressurization port 308, 408 has a larger orifice diameter than the orifice diameter of load port 302, 302A, by depressurizing through port 308, 408 the pressure in the fuel tank may be bled down faster. Depressurizing through port 308, 408 includes actuating FTIV 252 to position 354. Venting via depressurization port 308, 408 may be performed when the canister load is lower than a threshold load, when the ambient temperature is higher, or when the estimated depressurization time is higher than a threshold. In comparison, load port 302, 302A may have a smaller orifice diameter so that by depressurizing through port 302, 302A, the pressure in the fuel tank may be bled down slower. Depressurizing through load port 302, 30A may include actuating FTIV 252 to position 352. Venting via load port 302, 302A may be performed when the canister load is higher than a threshold load, (so that sudden fluctuations do not cause air-fuel excursions or unwanted emissions), when the ambient temperature is lower, or when the estimated depressurization time is lower than a threshold.

In still further examples, to decrease the pressure in fuel tank 220 to the pressure threshold, the controller may first adjust FTIV 252 to position 352 to depressurize the fuel tank rapidly via depressurization port 308, 408 to a first threshold pressure, and then adjust FTIV 252 to position 354 to depressurize the fuel tank at a slower rate via load port 302, 302A to a second threshold pressure, lower than the first threshold pressure.

For example, when the FTIV 252 is in a first (closed) position 350, fuel tank vapors (including running loss and diurnal loss vapors) can be retained in the fuel tank, such as in the ullage space of the fuel tank. FTIV 252 may be normally closed during most engine operations. FTIV 252 may be actuated to a second (open) position 352, wherein fuel tank vapors are directed into canister 222 via load port 302 and conduit 276) or load port 302A and conduit 476). FTIV 252 may be transitioned to the second position 352 from closed position 350 while fuel is dispensed into the fuel tank. Also, FTIV 252 may be transitioned to the second position when fuel tank depressurization is required while canister load is elevated. By directing fuel vapors to the canister via the load port 302 during these conditions, the larger buffer 310 associated with the load port can be leveraged to reduce the occurrence of potential fuel vapor spikes.

FTIV 252 may be actuated to a third (open) position 354, wherein fuel tank vapors are directed into canister 222 via depressurization port 308 and conduit 277 (or port 408 and conduit 477). FTIV 252 may be transitioned to the third position when fuel tank depressurization is required while canister load is lower. By directing fuel vapors to the canister via the depressurization port 308, 408 during these conditions, the shorter path to the vent line enabled via the depressurization port can be leveraged to expedite the fuel tank depressurization time, and allowing for a refueling event (wherein fuel is dispensed into the fuel tank) to be initiated earlier.

In this way, the components of FIGS. 1-4 enable an evaporative emissions system for a vehicle comprising a fuel tank including a pressure sensor; a fuel vapor canister having a load port coupled to a fuel tank via a first conduit, a depressurization port coupled to the fuel tank via a second conduit, a vent port coupled to atmosphere via a vent line, and a purge port coupled to an engine intake via a purge line; and a valve coupling the canister to the fuel tank, the valve actuatable between a first, second, and third position. The system may further comprise a refueling button coupled to a vehicle dashboard for receiving an operator request to refill the fuel tank; a filler pipe for receiving fuel in the fuel tank from a source external to the vehicle, access to the filler pipe controlled via a refueling lock; and a controller with computer-readable instructions stored on non-transitory memory which when executed cause the controller to: responsive to operator actuation of the refueling button and fuel tank pressure being higher than a threshold at the operator actuation, command the valve to the first position to depressurize the fuel tank by directing fuel tank vapors to the load port of the canister along the first conduit when canister load is higher than a threshold load; and command the valve to the second position to depressurize the fuel tank by directing fuel tank vapors to the depressurization port of the canister along the second conduit when canister load is lower than the threshold load. Optionally, the controller includes further instructions to: engage the refueling lock while the fuel tank is depressurized; and after the fuel tank has been depressurized, disengage the refueling lock and command the valve to the first position. Additionally, the controller includes further instructions that cause the controller to: responsive to operator actuation of the refueling button and fuel tank pressure being lower than the threshold at the operator actuation, command the valve to the first position while disengaging the refueling lock. Further, the controller may command the valve to the third position after the fuel tank has been filled, the third position sealing the canister from the fuel tank.

Turning now to FIG. 5, an example method 500 is shown for expediting depressurization of a fuel tank to enable fuel to be dispensed into a vehicle. The method enables a refueling event to occur with reduced customer dissatisfaction. Instructions for carrying out method 500 may be executed by a controller based on instructions stored on a memory of the controller and in conjunction with signals received from sensors of the vehicle system, such as the sensors described above with reference to FIGS. 1-2. The controller may employ actuators of the vehicle system to adjust a vehicle display, according to the methods described below.

At 502, the method includes confirming if refueling has been requested. In one example, refueling may be requested by a vehicle operator by actuating a refueling button in a vehicle dashboard or display. For example, the operator may request refueling via refueling button 197 on dashboard 197 of FIG. 1. If refueling is not requested, at 504, a controller may maintain a refueling lock of the fuel system engaged to disable fuel from being dispensed into the fuel tank. In addition, the controller may maintain a FTIV in a closed position to seal the fuel tank from the fuel vapor canister. As a result, fuel vapors generated in the fuel tank (such as from diurnal cycles or running loss) are retained in the fuel tank. Maintaining the FTIV in the closed position may include maintaining the three-way FTIV of FIG. 2 in a (first) position where access from the fuel tank to either of conduits 276 and 277 is disabled, the conduits coupling the fuel tank to the canister.

If a refueling request is confirmed, then at 506, the method includes estimating a fuel tank pressure, such as via a fuel tank pressure transducer coupled to the fuel tank. Alternatively, the fuel tank pressure may be inferred based on engine operating conditions such as duration and load of engine operation, and a rate of fuel consumption.

At 508, the method includes comparing the estimated fuel tank pressure (FTP) to a non-zero threshold pressure (threshhold_P). The threshold pressure may correspond to a pressure level above which fuel tank integrity may be compromised, such as due to excessive fuel tank pressure being present. The threshold may be based on size, dimensions, and configuration of the fuel tank, as well as the material that the fuel tank is made of. Further, the threshold pressure may be a function of the fuel type (e.g., octane rating or alcohol content) received in the fuel tank. If the fuel tank pressure is not higher than the threshold pressure, then the method moves to 524 to disengage the refueling lock of the fuel system to enable fuel to be received in the fuel tank.

Else, if the fuel tank pressure is above the threshold pressure (or if the difference between the estimated fuel tank pressure and the threshold pressure is larger than a threshold difference), then at 510, the method includes estimating the canister load and comparing it to a threshold load (threshold_L). In one example, the canister load is inferred based on feedback from a canister sensor, such as a pressure sensor, a hydrocarbon sensor, etc. In another example, the canister load is inferred based on engine operating conditions such as a duration of engine operation since a last purging of the canister, and an average engine load and combustion air-fuel ratio over the duration. Further still, besides the HC sensor and pressure sensor, a temperature sensor embedded in the carbon bed may also be used to estimate the canister loading state. In embodiments where multiple canisters are included serially, an average canister load of all the canisters may be estimated. Alternatively, the canister load of a terminal canister having a depressurization port may be estimated. In some examples, the canister load may be a non-zero load below which the vent side of the canister is clean of vapors. Otherwise, depressurization would result in vapor escaping to the atmosphere. In one example, the canister load may exceed the threshold load if the vehicle was parked in the sun for several days with the FTIV open, or with a leaky FTIV. As elaborated below, expedited depressurization may only be allowed if the terminal buffer of the canister is able to adsorb the depressurized vapors. If the canister load is above the threshold load, then the method moves to 516 to depressurize the fuel tank by routing tank vapors to the canister via a load port. This includes actuating the FTIV to a first open position (such as position 352 of FIGS. 3-4) which couples the fuel tank to the load port of the canister (or the load port of the most upstream canister in a multi-canister arrangement). The fuel tank is depressurized while maintaining a refueling lock engaged so that fuel cannot be dispensed into the fuel tank through a filler pipe.

If the canister load is not above the threshold load, then the method moves to 518 to depressurize the fuel tank by routing tank vapors to the canister via a depressurization port. This includes actuating the FTIV to a second open position (such as position 354 of FIGS. 3-4) which couples the fuel tank to the depressurization port of the canister (or the depressurization port of the most downstream canister in a multi-canister arrangement). The fuel tank is depressurized while maintaining the refueling lock engaged so that fuel cannot be dispensed into the fuel tank through a filler pipe.

At both 516 and 518, commanding the FTIV open to depressurize the fuel tank while maintaining the refueling lock engaged disables fuel from being added into the fuel tank until the fuel tank is sufficiently depressurized. As a result, the operator or attendant adding the fuel is protected from getting sprayed with fuel mist.

It will be appreciated that if in the midst of the rapid depressurization, a HC sensor detects breakthrough of vapors to atmosphere, then the 3-way FTIV valve may be controlled to load the canister through the normal path, via the load port.

In some examples, if the canister load is not above the threshold, the controller may further assess the estimated depressurization time to determine whether to depressurize via the load port or the depressurization port. For example, the method may move from 510 to 512 to estimate a depressurization time of the fuel tank. The depressurization time may be estimated based at least on fuel tank pressure, fuel temperature, and fuel tank ullage volume. For example, the controller may use a look-up table, algorithm, or model to estimate an amount of time it will take to depressurize the fuel tank from the higher than threshold pressure to a lower than threshold pressure. In another example, the threshold pressure (threshhold_P) is an upper threshold, and the controller may estimate an amount of time it will take to depressurize the fuel tank from a higher than upper threshold pressure to lower than a lower threshold pressure. The estimated time may increase as the fuel tank pressure increases, as the fuel temperature increases, and/or as the vapor space or ullage volume in the fuel tank decreases. The vapor space or ullage volume of the fuel tank may be determined as a function of the fuel tank fill level, the space decreasing as the fill level increases.

At 514, the estimated depressurization time is compared to a non-zero threshold time (threshold_T). The threshold time may be a duration longer than which customer satisfaction may be impacted, such as 15 seconds. If the estimated depressurization time is longer than the threshold, then the method may move to 518 to expedite depressurization by directing fuel vapors to the canister through the depressurization port. Else, the method may move to 516 to depressurize via the load port of the canister.

From each of 516 and 518, the method moves to 520 to confirm if fuel tank depressurization is complete. In one example, depressurization may be confirmed if the fuel tank pressure is lower than threshhold_P. In another example, where the threshold pressure (threshhold_P) is an upper threshold, the controller may confirm that the fuel tank pressure has dropped from above upper threshold pressure to lower than a lower threshold pressure. If the fuel tank has not depressurized sufficiently, at 522, the method includes continuing to depressurize the fuel tank by directing fuel vapors to the canister through the load port (at 516) or the depressurization port (at 518), while maintaining the refueling lock engaged.

After the tank has fully depressurized, at 524, the controller may provide signals to disengage the refueling lock to enable fuel to be received in fuel tank. At 526, the FTIV may be transitioned to a position that directs refueling vapors generated while fuel is dispensed into the fuel tank to the canister via the load port. For example, the FTIV may be actuated to position 352 of FIGS. 3-4. In this way, refueling vapors generated while fuel is dispensed into the fuel tank to be captured and retained at the fuel vapor canister for purging later.

At 528, it is determined if refueling is complete, such as may occur when the fuel tank reaches a fill level corresponding to a maximum capacity of the fuel tank. If not, then at 532, the controller may maintain the FTIV open in the position that couples the fuel tank to the canister via the load port, and the refueling lock disengaged while receiving fuel in fuel tank via the refueling door. Else, once refueling is completed, at 530, the controller commands the FTIV closed and engages the refueling lock. For example, the FTIV may be actuated to position 350 of FIGS. 3-4. This seals the fuel tank from the canister until a subsequent fuel tank depressurization or refueling event.

Turning now to FIG. 6, map 600 depicts a prophetic example of fuel tank depressurization during a refueling event via a 4-port canister and a 3-way FTIV. Map 600 depicts a refueling request (indicated by an operator pressing a refueling button on a vehicle dashboard) at plot 602. Canister load is shown at plot 604. Fuel tank pressure, relative to a threshold, is depicted at plot 606. The position of a three-way FTIV is shown at plot 608, the position changeable between a closed position (C), a position where the fuel tank is coupled to a load port of the canister (L), and a position where the fuel tank is coupled to a depressurization port of the canister (D). The status of a refueling lock (engaged or disengaged) is shown at plot 610. All plots are shown over time along the x-axis. In the depicted example, the operations may be performed in the context of a hybrid electric vehicle.

Prior to t1, the vehicle is operating and no refueling is requested. The canister load (plot 604) is low due to canister fuel vapors being purged to the engine intake during vehicle propulsion using engine torque. The fuel tank pressure (plot 606) is elevated due to running losses accumulating in the fuel tank's ullage space. At t1, the vehicle is stopped and the operator indicates a request to refill the tank by actuating a refueling button on a vehicle dashboard. Due to the fuel tank pressure exceeding the threshold at the time refueling is requested, and the canister load being lower (e.g., than a threshold), the fuel tank is depressurized by actuating the FTIV from the closed position to the position (D) that couples the fuel tank to the depressurization port of the canister. This allows for depressurization to be expedited so that the fuel tank can be refueled following a shorter delay. At this time, the refueling lock is maintained engaged so that fuel cannot be received in the fuel tank.

The FTIV is held at the D position from t1 to t2. As the fuel tank depressurizes, the canister load increases due to fuel vapors being adsorbed in the canister. At t2, responsive to tank depressurization to a level below the threshold, the refueling lock is disengaged to allow fuel to be dispensed into the fuel tank. Also at t2, the FTIV is transitioned to the position (L) that couples the fuel tank to the load port of the canister. This allows refueling vapors generated while fuel is dispensed into the fuel tank be loaded into the canister for purging at a later time. This is reflected by the larger increase in canister load between t2 and t3 (as compared to canister load increase between t1 and t2). At t3, fueling is completed and the FTIV is returned to the default closed position.

As such, if the fuel tank were not depressurized via the depressurization port but via the load port at t1 (see dashed line 614), the fuel tank would have taken longer to depressurize (see dashed region 612). As a result, there would be a delay in when the refueling lock could be disengaged and fuel could be dispensed into the fuel tank (see dashed plot 616). In particular, fuel could not be dispensed until significantly after t2.

Between t3 and t4, the vehicle is propelled and no refueling is requested. The vehicle may be propelled with at least some engine torque. The canister load decreases as fuel vapors are purged to the engine intake.

At t4, the vehicle is stopped again and the operator indicates another request to refill the tank by actuating the refueling button on the vehicle dashboard. Due to the fuel tank pressure exceeding the threshold at the time refueling is requested, and the canister load being higher (e.g., than the threshold), the fuel tank is depressurized by actuating the FTIV from the closed position to the position (L) that couples the fuel tank to the load port of the canister. The FTIV is held at the L position from t4 to t5. As the fuel tank depressurizes, the canister load increases due to fuel vapors being adsorbed in the canister. At t5, responsive to tank depressurization to a level below the threshold, the refueling lock is disengaged to allow fuel to be dispensed into the fuel tank while the FTIV is maintained at the L position so that refueling vapors generated while fuel is dispensed into the fuel tank to be loaded into the canister for purging at a later time. This is reflected by the increase in canister load between t5 and t6 (as compared to canister load increase between t1 and t2). At t6, fueling is completed and the FTIV is returned to the default closed position.

In this way, during a refueling event, a depressurization time remaining before fuel can be dispensed into a fuel tank can be reduced by loading a canister via an added depressurization port. The technical effect of providing a three-way FTIV is that based on canister conditions, depressurization fuel vapors can be selectively directed to a load port or a depressurization port of a canister, allowing for variation in the region of the canister where vapors are adsorbed as well as a time required to depressurize the tank. By expediting depressurization times, fuel can be dispensed into a fuel tank earlier, even in electrified vehicles having large fuel tanks and multiple serially arranged canisters. As such, this may reduce customer dissatisfaction associated with refueling delays. For example, reduction in refueling delays may preempt a customer from repeatedly pressing a refueling button on the vehicle's dashboard, thereby reducing controller errors.

An example vehicle method comprises: responsive to a refueling request, actuating a valve to a first position to depressurize a fuel tank to a first port of a canister while maintaining a refueling lock engaged; and after depressurization of the fuel tank, disengaging the refueling lock and actuating the valve to a second position to direct refueling vapors to a second, different port of the canister. In the preceding example, additionally or optionally, the first port is closer to a vent port of the canister than the second port. In any or all of the preceding examples, additionally or optionally, the first port is surrounded by a smaller adsorbent buffer than the second port. In any or all of the preceding examples, additionally or optionally, the method further comprises, responsive to sensor output indicative of hydrocarbon breakthrough during the depressurization, actuating the valve to the second position and completing depressurization of the fuel tank via the second port of the canister. In any or all of the preceding examples, additionally or optionally, the valve is maintained at the second position until the fuel tank has been refilled, and then the valve is actuated to a third position that seals the canister from the fuel tank. In any or all of the preceding examples, additionally or optionally, the depressurizing is responsive to sensed fuel tank pressure being higher than a threshold pressure when the refueling request is received. In any or all of the preceding examples, additionally or optionally, the valve is maintained at the first position until the sensed fuel tank pressure is below the threshold pressure. In any or all of the preceding examples, additionally or optionally, the depressurizing to the first port is responsive to a higher than threshold canister load, the method further comprising, depressurizing to the second port responsive to a lower than threshold canister load. In any or all of the preceding examples, additionally or optionally, depressurizing to the second port includes actuating the valve to the second position. In any or all of the preceding examples, additionally or optionally, the first port has a larger orifice than the second port. In any or all of the preceding examples, additionally or optionally, the canister further includes a third port for receiving ambient air and a fourth port for purging fuel vapors to an engine intake, wherein the canister is serially arranged downstream of a plurality of canisters, and wherein each of the plurality of canisters includes the second, third, and fourth port and does not include the first port.

Another example method for a vehicle, comprises: during a first fuel tank refueling event, depressurizing a fuel tank to a load port of a canister responsive to higher canister load; and during a second fuel tank refueling event, depressurizing the fuel tank to a depressurization port of the canister responsive to lower canister load, the load port positioned on a proximal end of the canister with a purge port, the depressurization port positioned on a distal end of the canister with a vent port. In any or all of the preceding examples, additionally or optionally, the method further comprises, during both the first and second fuel tank refueling event, maintaining a refueling lock engaged while depressurizing the fuel tank, and disengaging the refueling lock after the depressurizing is completed. In any or all of the preceding examples, additionally or optionally, depressurizing the fuel tank to the load port of the canister includes actuating a three-way valve coupling the fuel tank to the canister to a first position, and depressurizing the fuel tank to the depressurization port of the canister includes actuating the three-way valve to a second, different position. In any or all of the preceding examples, additionally or optionally, the method further comprises, during the second fuel tank refueling event, actuating the three-way valve from the second position to the first position responsive to one of fuel tank depressurization being complete and sensed hydrocarbon breakthrough during the fuel tank depressurization. In any or all of the preceding examples, additionally or optionally, the method further comprises, during the first and the second fuel tank refueling event, after depressurizing the fuel tank, maintaining the three-way valve in the first position with the refueling lock disengaged until refueling is completed, and then actuating the three-way valve to a third position that seals the fuel tank from the canister.

Another example evaporative emissions system for a vehicle comprises: a fuel tank including a pressure sensor; a fuel vapor canister having a load port coupled to a fuel tank via a first conduit, a depressurization port coupled to the fuel tank via a second conduit, a vent port coupled to atmosphere via a vent line, and a purge port coupled to an engine intake via a purge line; and a valve coupling the canister to the fuel tank, the valve actuatable between a first, second, and third position. In any or all of the preceding examples, additionally or optionally, the system further comprises a refueling button coupled to a vehicle dashboard for receiving an operator request to refill the fuel tank; a filler pipe for receiving fuel in the fuel tank from a source external to the vehicle, access to the filler pipe controlled via a refueling lock; and a controller with computer-readable instructions stored on non-transitory memory which when executed cause the controller to: responsive to operator actuation of the refueling button and fuel tank pressure being higher than a threshold at the operator actuation, command the valve to the first position to depressurize the fuel tank by directing fuel tank vapors to the load port of the canister along the first conduit when canister load is higher than a threshold load; and command the valve to the second position to depressurize the fuel tank by directing fuel tank vapors to the depressurization port of the canister along the second conduit when canister load is lower than the threshold load. In any or all of the preceding examples, additionally or optionally, the controller includes further instructions to: engage the refueling lock while the fuel tank is depressurized; and after the fuel tank has been depressurized, disengage the refueling lock and command the valve to the first position. In any or all of the preceding examples, additionally or optionally, the controller includes further instructions that cause the controller to: responsive to operator actuation of the refueling button and fuel tank pressure being lower than the threshold at the operator actuation, command the valve to the first position while disengaging the refueling lock. In any or all of the preceding examples, additionally or optionally, the controller includes further instructions that cause the controller to: command the valve to the third position after the fuel tank has been filled, the third position sealing the canister from the fuel tank. In any or all of the preceding examples, additionally or optionally, the controller includes further instructions that cause the controller to: command the valve from the second position to the first position during the depressurization via the depressurization port responsive to hydrocarbon breakthrough sensed via a sensor coupled to the vent line.

In a further representation, the vehicle is a hybrid electric vehicle system. In another further representation, the controller may estimate a depressurization time based on fuel system conditions and select whether to depressurize via the load port or the depressurization port of the canister based on the estimated time. In the preceding example, additionally or optionally, the controller may depressurize the fuel tank via the load port when the estimated depressurization time is smaller, and via the depressurization port of the canister when the estimated time is larger. In a further representation, a method for a fuel system comprises, responsive to a refueling request, depressurizing a fuel tank to a depressurization port of a canister until fuel tank pressure is below a threshold and, responsive to hydrocarbon breakthrough sensed during the depressurization while the fuel tank pressure is above the threshold, transitioning to depressurizing the fuel tank to a load port of the canister. In the preceding example, the hydrocarbon breakthrough is sensed via a hydrocarbon sensor coupled to a vent line of the fuel system, the vent line coupled to a vent port of the canister.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle method, comprising:
responsive to a refueling request,
actuating a valve to a first position to depressurize a fuel tank to a first port of a canister while maintaining a refueling lock engaged; and
after depressurization of the fuel tank, disengaging the refueling lock and actuating the valve to a second position to direct refueling vapors to a second, different port of the canister.

2. The method of claim 1, wherein the first port is closer to a vent port of the canister than the second port and surrounded by a smaller adsorbent buffer than the second port.

3. The method claim 1, further comprising, responsive to sensor output indicative of hydrocarbon breakthrough during the depressurization, actuating the valve to the second position and completing depressurization of the fuel tank via the second port of the canister.

4. The method of claim 1, wherein the valve is maintained at the second position until the fuel tank has been refilled, and then the valve is actuated to a third position that seals the canister from the fuel tank.

5. The method of claim 1, wherein the depressurizing is responsive to sensed fuel tank pressure being higher than a threshold pressure when the refueling request is received.

6. The method of claim 5, where the valve is maintained at the first position until the sensed fuel tank pressure is below the threshold pressure.

7. The method of claim 5, wherein the depressurizing to the first port is responsive to a higher than threshold canister load, the method further comprising, depressurizing to the second port responsive to a lower than threshold canister load.

8. The method of claim 7, wherein depressurizing to the second port includes actuating the valve to the second position.

9. The method of claim 1, wherein the first port has a larger orifice than the second port.

10. The method of claim 1, wherein the canister further includes a third port for receiving ambient air and a fourth port for purging fuel vapors to an engine intake, wherein the canister is serially arranged downstream of a plurality of canisters, and wherein each of the plurality of canisters includes the second, third, and fourth port and does not include the first port.

11. A method for a vehicle, comprising:
during a first fuel tank refueling event, depressurizing a fuel tank to a load port of a canister responsive to higher canister load;
during a second fuel tank refueling event, depressurizing the fuel tank to a depressurization port of the canister responsive to lower canister load, the load port positioned on a proximal or same end of the canister with a purge port, the depressurization port positioned on a distal or opposite end of the canister with a vent port; and
during both the first and second fuel tank refueling event, maintaining a refueling lock engaged while depressurizing the fuel tank, and disengaging the refueling lock after the depressurizing is completed.

12. The method of claim 11, wherein depressurizing the fuel tank to the load port of the canister includes actuating a three-way valve coupling the fuel tank to the canister to a first position, and depressurizing the fuel tank to the depressurization port of the canister includes actuating the three-way valve to a second, different position.

13. The method of claim 12, further comprising, during the second fuel tank refueling event, actuating the three-way valve from the second position to the first position responsive to one of fuel tank depressurization being complete and sensed hydrocarbon breakthrough during the fuel tank depressurization.

14. The method of claim 13, further comprising, during the first and the second fuel tank refueling event, after depressurizing the fuel tank, maintaining the three-way valve in the first position with the refueling lock disengaged until refueling is completed, and then actuating the three-way valve to a third position that seals the fuel tank from the canister.

15. An evaporative emissions system for a vehicle, comprising:
a fuel tank including a pressure sensor;
a fuel vapor canister having a load port coupled to a fuel tank via a first conduit, a depressurization port coupled to the fuel tank via a second conduit, a vent port coupled to atmosphere via a vent line, and a purge port coupled to an engine intake via a purge line; and
a valve coupling the canister to the fuel tank, the valve actuatable between a first, second, and third position so as to permit controllably coupling the canister to the fuel tank via the first conduit and to permit controllably coupling the canister to the fuel tank via the second conduit.

16. The system of claim 15, further comprising:
a refueling button coupled to a vehicle dashboard for receiving an operator request to refill the fuel tank;
a filler pipe for receiving fuel in the fuel tank from a source external to the vehicle, access to the filler pipe controlled via a refueling lock; and
a controller with computer-readable instructions stored on non-transitory memory which when executed cause the controller to:
responsive to operator actuation of the refueling button and fuel tank pressure being higher than a threshold at the operator actuation,
command the valve to the first position to depressurize the fuel tank by directing fuel tank vapors to the load port of the canister along the first conduit when canister load is higher than a threshold load; and
command the valve to the second position to depressurize the fuel tank by directing fuel tank vapors to the depressurization port of the canister along the second conduit when canister load is lower than the threshold load.

17. The system of claim 16, wherein the controller includes further instructions to:
engage the refueling lock while the fuel tank is depressurized; and
after the fuel tank has been depressurized, disengage the refueling lock and command the valve to the first position.

18. The system of claim 16, wherein the controller includes further instructions that cause the controller to:
responsive to operator actuation of the refueling button and fuel tank pressure being lower than the threshold at the operator actuation, command the valve to the first position while disengaging the refueling lock.

19. The system of claim 17, wherein the controller includes further instructions that cause the controller to:
command the valve to the third position after the fuel tank has been filled, the third position sealing the canister from the fuel tank; and
command the valve from the second position to the first position during the depressurization via the depressurization port responsive to hydrocarbon breakthrough sensed via a sensor coupled to the vent line.

* * * * *